UNITED STATES PATENT OFFICE.

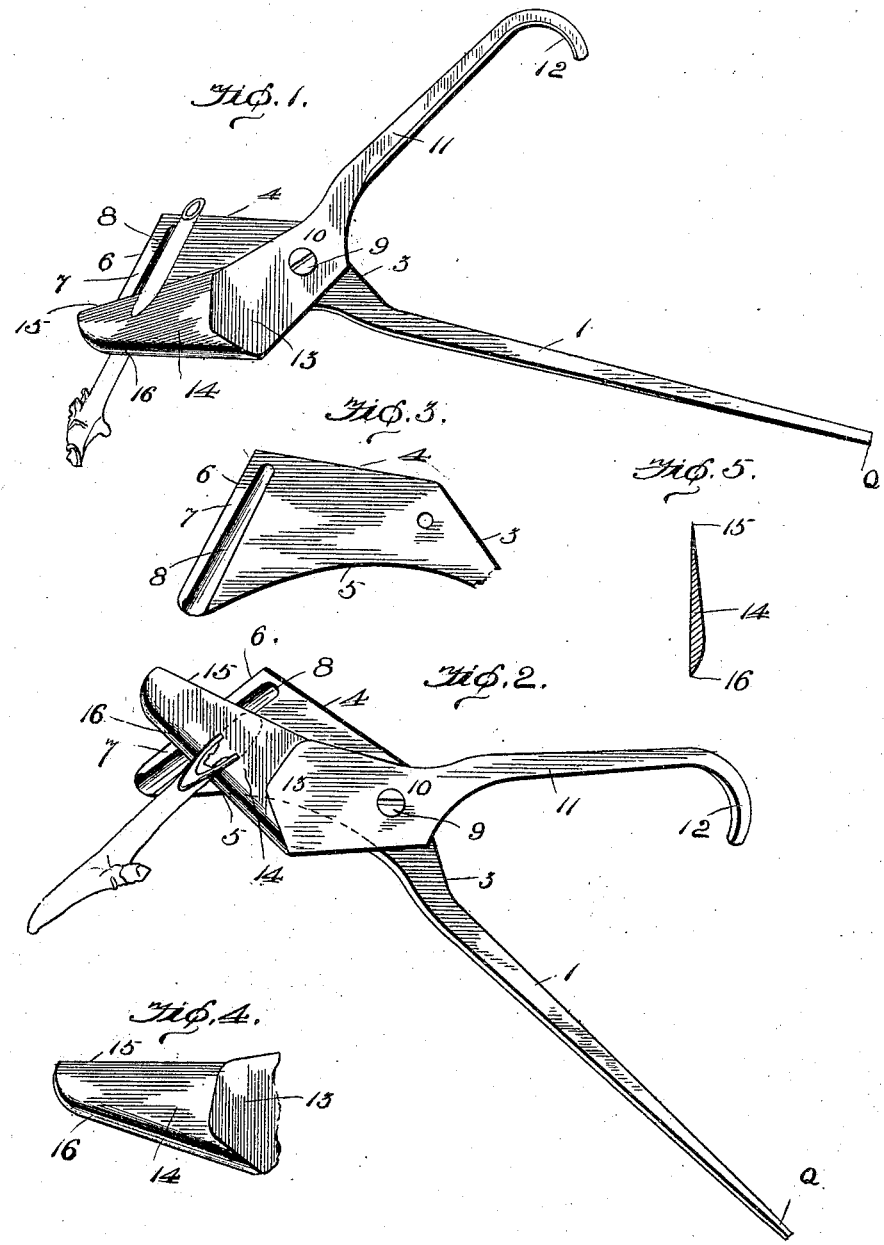

DAVID A. MANUEL, OF CALISTOGA, CALIFORNIA.

GRAFTING IMPLEMENT.

SPECIFICATION forming part of Letters Patent No. 690,865, dated January 7, 1902.

Application filed September 13, 1901. Serial No. 75,338. (No model.)

*To all whom it may concern:*

Be it known that I, DAVID A. MANUEL, a citizen of the United States, residing at Calistoga, in the county of Napa and State of California, have invented certain new and useful Improvements in Grafting Implements, of which the following is a specification.

My invention relates to improvements in grafting implements; and the main object of my invention is the provision of an implement which may be used upon a bench and be operated to make various-shaped cuts, and thus allow the proper joint to be made, so that the branches or twigs may be grafted.

To attain these objects, my invention consists of a grafting implement embodying novel features of construction and combination of parts substantially as disclosed herein.

In the drawings, Figure 1 is a perspective view of the implement cutting a scion, the operation being known as "closing a cut." Fig. 2 is a similar view of the implement splitting a scion, this operation being known as "opening a cut." Fig. 3 is a plan view of the guiding-blade. Fig. 4 is a similar view of the cutting-blade, and Fig. 5 is a section through the cutting-blade.

Referring to the drawings, the numeral 1 designates the long handle, which is provided with the pointed end Q, so that the implement may be set in a bench when the operator is bench-grafting. This handle is further provided upon its outer end with the curve 3, a substantially straight edge 4, the deep curve 5, and the substantially right-angled end 6. This end is further provided with the guide-strip 7, and upon the same side and parallel with this guide-strip is the beveled groove 8, which is formed in the body of the blade.

Pivoted by means of the pin or rivet 9 is the body 10 of the handle 11, which is provided with the hooked end 12 and the broadened outer end 13. Carried by this end 13 is the cutting-blade 14, which is provided with the straight cutting edge 15 and the knife-shaped or curved cutting edge 16 upon its opposite side. This blade 14 is attached to the end 13 so as to form an obtuse angle with one edge and a much sharper obtuse angle with the other edge, the purpose of which will appear later.

From the foregoing description, taken in connection with the drawings, the operation of my improved grafting implement is readily understood and its numerous advantages fully appreciated; but the operation, briefly stated, is as follows: In bench-grafting the point 1 is placed securely in the bench, and the upper end of the handle is in such a position as to allow the cutting-blade to be operated freely. To cut a scion or make a closing cut, the twig is placed in the beveled groove, the cutting-blade being wide open and upon the outer side of the guiding-blade. By pressing upon the cutting-blade handle the straight cutting edge is brought in contact with the scion and by means of the inclined guide-strip the blade is caused to cut the scion from the outside toward the center. To split a scion or what we term "opening a cut," the cutting-blade is upon the inner side of the guiding-blade, and the graft is placed upon the surface of the guiding-blade, and the handle of the cutting-blade is pulled upon, so as to bring the curved cutting edge into contact with the end of the graft, and thereby split it or open the cut.

It is evident that I provide a grafting implement which is the embodiment of simplicity, durability, and cheapness, thus producing a thoroughly efficient and practical device.

What I claim as new is—

1. A grafting implement consisting of a guiding-blade, and a cutting-blade pivotally connected with said guiding-blade so as to swing clear of each side of the guiding-blade and cut on the return in both directions, said cutting-blade having a straight and a curved cutting edge.

2. A grafting implement comprising a long handle, a guiding-blade carried by said long handle, and a cutting-blade pivotally secured to said guiding-blade and adapted to swing clear of both sides thereof, said cutting-blade having a straight cutting edge and an oppositely-arranged curved cutting edge.

3. A grafting implement comprising a long handle, a guiding portion carried by said long handle, said guiding portion being provided with a beveled groove, and a cutting-blade pivotally connected with said long handle and guided in its movements by said guiding portion, said cutting-blade having a straight cutting edge and an oppositely-arranged curved cutting edge.

4. A grafting implement, comprising a long handle, a guiding portion carried by said handle and provided with a groove, and a double-edged cutting-blade pivotally connected with said long handle and guided in its movements by said guiding portion.

5. A grafting implement comprising a guiding portion, an inclined groove formed in the body of said guiding portion, and a double-edged blade pivotally connected to said guiding portion and adapted to swing so as to cut with either edge.

6. A grafting implement comprising a long handle, a guiding means carried by said handle and another handle pivotally connected to said long handle and carrying a blade to split or cut a scion, said blade being at a slight angle to the handle and having a straight and a curved cutting edge.

In testimony whereof I affix my signature in presence of two witnesses.

DAVID A. MANUEL.

Witnesses:
  F. E. McCUTCHEN,
  M. J. SIMMONS.